(12) United States Patent
Song

(10) Patent No.: US 11,936,746 B2
(45) Date of Patent: Mar. 19, 2024

(54) METHOD AND DEVICE FOR HANDLING PERSONAL DATA IN M2M SYSTEM

(71) Applicants: Hyundai Motor Company, Seoul (KR); Kia Corporation, Seoul (KR); Industry Academy Cooperation Foundation of Sejong University, Seoul (KR)

(72) Inventor: Jae Seung Song, Seoul (KR)

(73) Assignees: Hyundai Motor Company, Seoul (KR); Kia Corporation, Seoul (KR); Industry Academy Cooperation Foundation of Sejong University, Seoul (KR)

(*) Notice: Subject to any disclaimer, the term of this patent is extended or adjusted under 35 U.S.C. 154(b) by 0 days.

(21) Appl. No.: 17/793,844

(22) PCT Filed: Jan. 22, 2021

(86) PCT No.: PCT/KR2021/000906
§ 371 (c)(1),
(2) Date: Jul. 19, 2022

(87) PCT Pub. No.: WO2021/162272
PCT Pub. Date: Aug. 19, 2021

(65) Prior Publication Data
US 2023/0069129 A1 Mar. 2, 2023

Related U.S. Application Data

(60) Provisional application No. 63/084,130, filed on Sep. 28, 2020, provisional application No. 62/972,723, filed on Feb. 11, 2020.

(51) Int. Cl.
*H04L 67/306* (2022.01)
*H04L 9/40* (2022.01)
(Continued)

(52) U.S. Cl.
CPC ............ *H04L 67/306* (2013.01); *H04L 63/10* (2013.01); *H04L 65/1069* (2013.01);
(Continued)

(58) Field of Classification Search
CPC ... H04W 4/02; H04L 67/306; H04L 67/51–52
See application file for complete search history.

(56) References Cited

U.S. PATENT DOCUMENTS

| 2014/0289366 A1* | 9/2014 | Choi | ............... G06F 9/4451 709/218 |
| 2018/0020505 A1* | 1/2018 | Deros | ............ F21V 33/0048 |
| 2021/0021664 A1* | 1/2021 | Oyman | ............ H04N 19/597 |

FOREIGN PATENT DOCUMENTS

| KR | 101553478 B1 | 9/2015 |
| KR | 101688812 B1 | 12/2016 |

(Continued)

*Primary Examiner* — Mahran Y Abu Roumi
(74) *Attorney, Agent, or Firm* — Fox Rothschild LLP

(57) ABSTRACT

The present invention relates to a method and apparatus for handling personal data in a machine-to-machine (M2M) system, and an operation method of an M2M device includes obtaining information related to consent of a user for personal data provided from an Internet of things (IoT) device and creating a consent-related resource based on the information. The resource includes at least one attribute related to the consent.

13 Claims, 13 Drawing Sheets

(51) Int. Cl.
*H04L 65/1069* (2022.01)
*H04L 65/1073* (2022.01)
*H04L 67/12* (2022.01)
*H04L 67/60* (2022.01)

(52) U.S. Cl.
CPC .......... *H04L 65/1073* (2013.01); *H04L 67/12* (2013.01); *H04L 67/60* (2022.05)

(56) References Cited

FOREIGN PATENT DOCUMENTS

| KR | 2018-0004119 A | 1/2018 | |
|---|---|---|---|
| KR | 2019-0124908 A | 11/2019 | |
| WO | 2016/178548 A1 | 11/2016 | |
| WO | 2019/217151 A1 | 11/2019 | |
| WO | 2019/246402 A1 | 12/2019 | |
| WO | WO-2019246402 A1 * | 12/2019 | ............. G16Y 30/10 |

* cited by examiner

METHOD AND DEVICE FOR HANDLING PERSONAL DATA IN M2M SYSTEM

CROSS-REFERENCE TO RELATED APPLICATIONS

This application is a National Phase application filed under 35 USC 371 of PCT International Application No. PCT/KR2021/000906 with an International Filing Date of Jan. 22, 2021, which claims the benefit of U.S. Provisional Application 63/084,130 as filed on Sep. 28, 2020 and U.S. Provisional Application 62/972,723 as filed on Feb. 11, 2020. The entire contents of these applications are incorporated herein by reference in their entirety.

BACKGROUND OF THE INVENTION

Field of the Invention

The present invention relates to a method and apparatus for handling personal data in a machine-to-machine (M2M) system. More particularly, the present invention relates to a method and apparatus for confirming consent to handle personal data in an M2M system.

Description of the Related Art

Recently, introduction of a Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication, IoT technology, technologies for architecture, Application Program Interface (API) specifications, security solutions, and interoperability. The specifications of the oneM2M standardization organization provide a framework to support a variety of applications and services such as smart cities, smart grids, connected cars, home automation, security and health.

SUMMARY

The present invention is directed at providing a method and apparatus for safely handling personal data in a machine-to-machine (M2M) system.

The present invention is directed at providing a method and apparatus for effectively confirming consent of a user to use personal data in a machine-to-machine (M2M) system.

According to an embodiment of the present invention, a method for operating a machine-to-machine (M2M) device in an M2M system includes: obtaining information associated with a consent of a user for personal data provided from an Internet of things (IoT) device; and creating a consent-related resource based on the information. The resource includes at least one attribute associated with the consent.

According to an embodiment of the present invention, a machine-to-machine (M2M) device in an M2M system includes a transceiver configured to transmit and receive a signal and a processor configured to control the transceiver. The processor is further configured to obtain information associated with a consent of a user for personal data provided from an Internet of things (IoT) device and to create a consent-related resource based on the information. The resource includes at least one attribute associated with the consent.

According to the present disclosure, personal data may be safely processed in a machine-to-machine (M2M) system.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
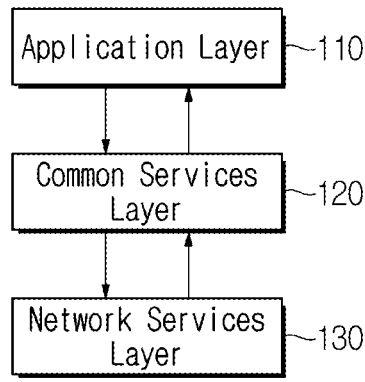
FIG. 1 illustrates a layered structure of a machine-to-machine (M2M) system according to the present disclosure.

Hereinafter, exemplary embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various exemplary embodiments are also included in the scope of the present disclosure.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

Although an exemplary embodiment is described as using a plurality of units to perform the exemplary process, it is understood that the exemplary processes may also be performed by one or a plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on an M2M communication network but is not limited thereto. An M2M terminal may operate based on another wireless communication network and is not limited to the exemplary embodiments described above.

In addition, an M2M terminal may be fixed or have mobility. An M2M server refers to a server for M2M communication and may be a fixed station or a mobile station. In the present specification, an entity may refer to hardware like an M2M device, M2M gateway and M2M server. In addition, for example, an entity may be used to refer to a software configuration in a layered structure of an M2M system and is not limited to the embodiments described above.

In addition, for example, the present disclosure mainly describes an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

The present invention relates to a method and apparatus for handling personal data in a machine-to-machine (M2M) system. More particularly, the present invention describes a technology for confirming consent to handle personal data in an M2M system.

oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of an Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
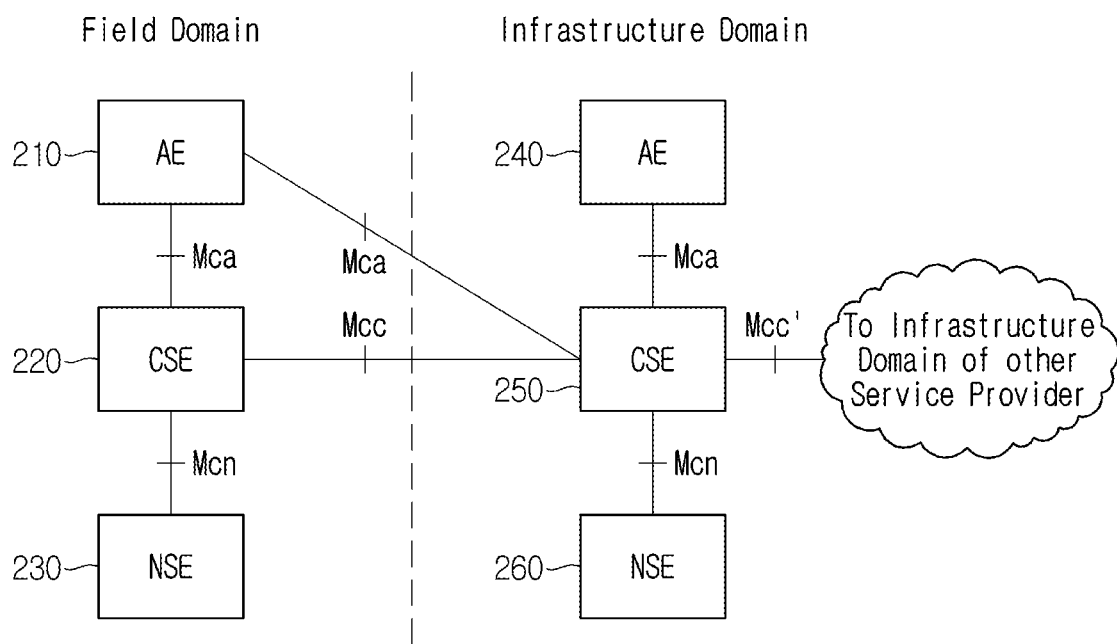
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
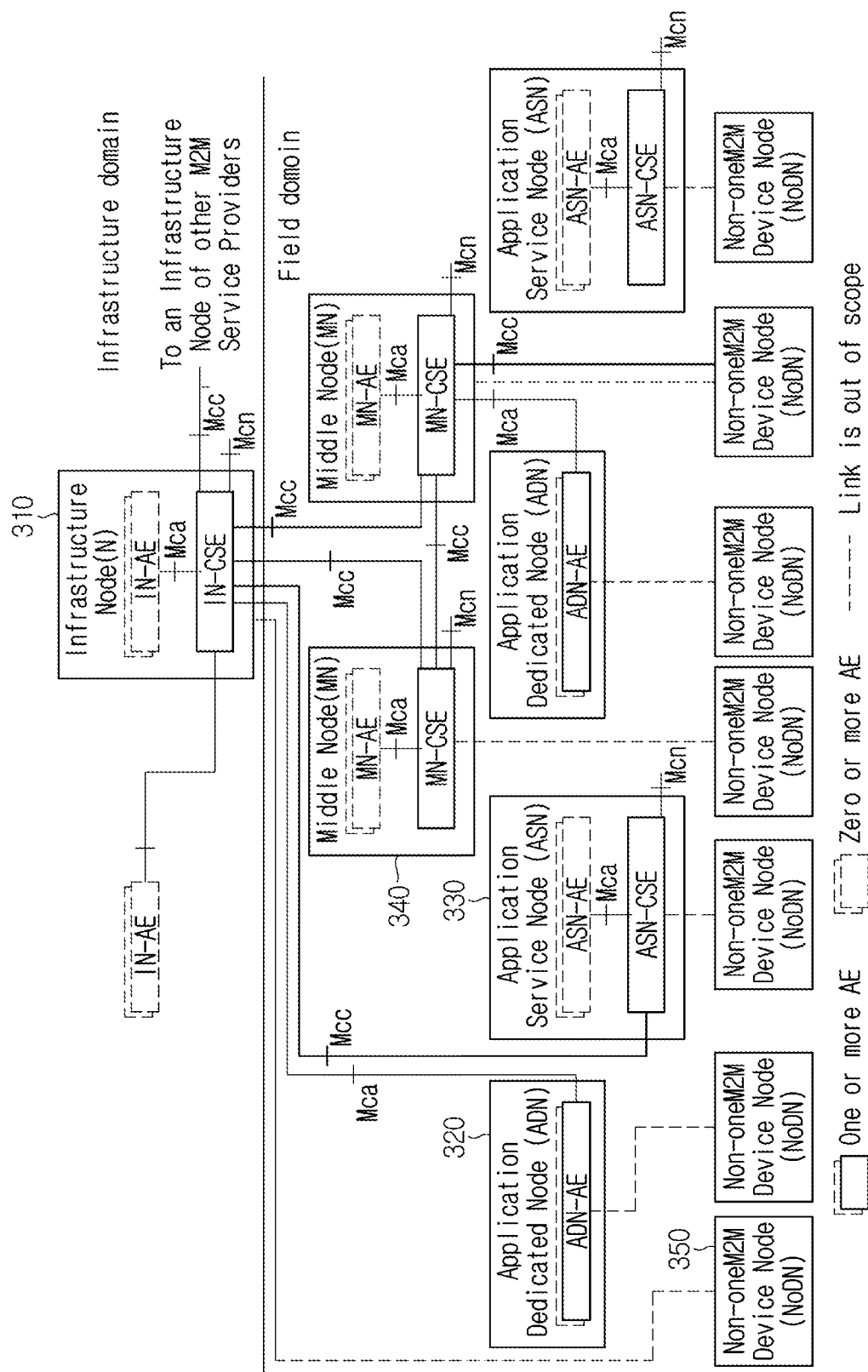
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not a CSE. In particular, an ADN may be set in the field domain. In other words, an ADN may be a dedicated node for an AE. For example, an ADN may be a node that is set in an M2M terminal in hardware. In addition, the application service node (ASN) 330 may be a node including one CSE and at least one AE. An ASN may be set in the field domain. In other words, it may be a node including an AE and a CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
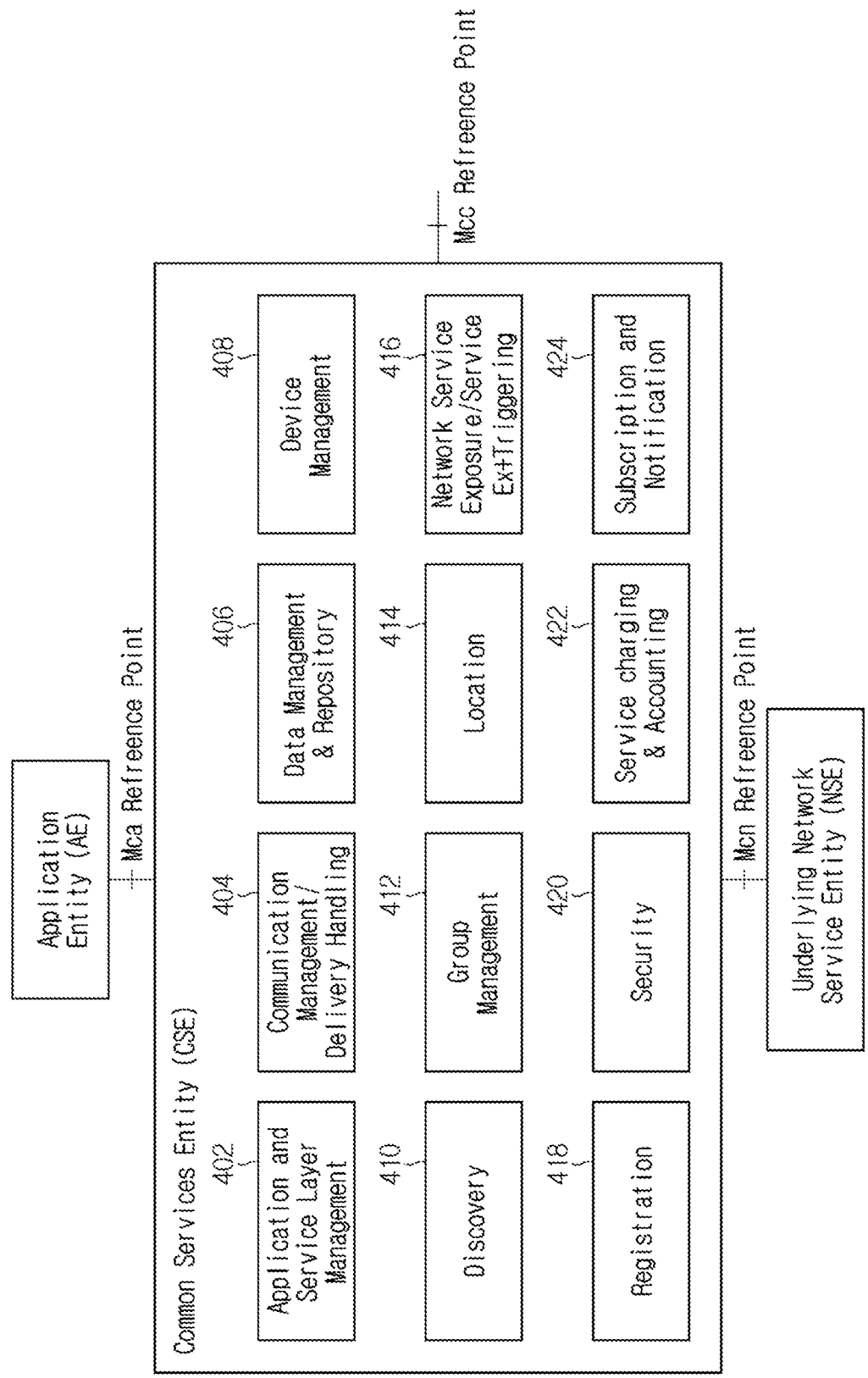
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiments.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine whether to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notification of the occurrence of the event.

Figure 5:
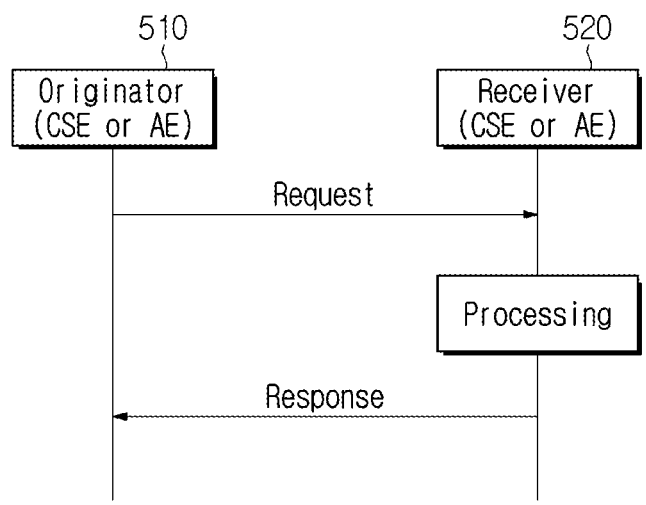
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiments. In addition, for example, the originator 510 and the receiver 520 may be nodes, entities, servers or gateways, which are described above. In other words, the originator 510 and the receiver 520 may be hardware or software configurations and are not limited to the above-described embodiments.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete or Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between an AE and a CSE based on the reference point Mca or between CSEs based on the reference point Mcc. In other words, the originator 510 may be an AE or a CSE, and the receiver 520 may be an AE or a CSE. According to an operation in a request message, such a message exchange process as illustrated in FIG. 5 may be initiated by either an AE or a CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

| Response message parameter/success or not |
| --- |
| Response Status Code - successful, unsuccessful, ack |
| Request Identifier - uniquely identifies a Request message |
| Content - to be transferred |
| To - the identifier of the Originator or the Transit CSE that sent the corresponding non-blocking request |
| From - the identifier of the Receiver |
| Originating Timestamp - when the message was built |
| Result Expiration Timestamp - when the message expires |
| Event Category - what event category shall be used for the response message |
| Content Status |
| Content Offset |
| Token Request Information |
| Assigned Token Identifiers |
| Authorization Signature Request Information |
| Release Version Indicator - the oneM2M release version that this response message conforms to |

A filter criteria condition, which can be used in a request message or a response message, may be defined as in Table 2 and Table 3 below.

TABLE 2

| Condition tag | Multiplicity | Description Matching Conditions |
| --- | --- | --- |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |

TABLE 2-continued

| Condition tag | Multiplicity | Description |
|---|---|---|
| | | Matching Conditions |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'.<br>If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned. |

TABLE 3-continued

| Condition tag | Multiplicity | Description Filter Handling Conditions |
|---|---|---|
| | | If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . ./tempContainer/LATEST). This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation - operation to be executed/CREAT, Retrieve, Update, Delete, Notify |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Group Request Target Members-indicates subset of members of a group |
| | Filter Criteria - conditions for filtered retrieve operation |
| | Desired Identifier Result Type - format of resource identifiers returned |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |

TABLE 4-continued

| Request message parameter |
|---|
| Role IDs - for use in role based access control |
| Local Token IDs - for use in dynamic authorization |
| Authorization Signature Indicator - for use in Authorization Relationship Mapping |
| Authorization Signature - for use in Authorization Relationship Mapping |
| Authorization Relationship Indicator - for use in Authorization Relationship Mapping |
| Semantic Query Indicator - for use in semantic queries |
| Release Version Indicator - the oneM2M release version that this request message conforms to. |
| Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

The General Data Protection Regulation (GDPR) is a regulation in EU law on data protection and privacy for all individual citizens of the European Union (EU) and the European Economic Area (EEA). Business processes that handle personal data should be designed and built with consideration of the principles and provide safeguards to protect data. In addition, business processes that handle personal data use the highest-possible privacy setting by default, so that the data is not available publicly without explicit, informed consent, and cannot be used to identify a subject without additional information stored separately.

Under GDPR, processing personal data is generally prohibited, unless it is expressly allowed by law, or the data subject has consented to the processing. Consent should be freely given, specific, informed and unambiguous. In order to obtain freely given consent, it should be given on a voluntary basis. Therefore, it is very important how to manage consent in IoT platforms.

A scheme for providing consent for IoT data may be derived in the following three ways. First, consent may be provided via a web interface. In this case, consent may be added after an application is registered to an IoT platform. Second, consent may be provided as consent or non-consent is implicitly included in a registration procedure. Third, consent may be provided by interactive registration. For this, the registration procedure may include a step of acquiring consent from a user of an IoT application. However, oneM2M spec has an access control policy (ACP), but the ACP does not handle consent of IoT data. In addition, no similar concept with consent has been introduced to oneM2M spec. In oneM2M spec, there is no way to indicate whether or not processing(covering) IoT data is allowed.

The three ways of providing consent of a user to use personal data may be described in further details as follows.

1. Post-provisioning: an IoT application is registered to an IoT platform without consent. Once the data of the IoT application is identified as a personal data, a user may select consent. For example, the user may select consent by a web interface. An example of a procedure for post-provisioning is illustrated in FIG. 6A.

Figure 6A:
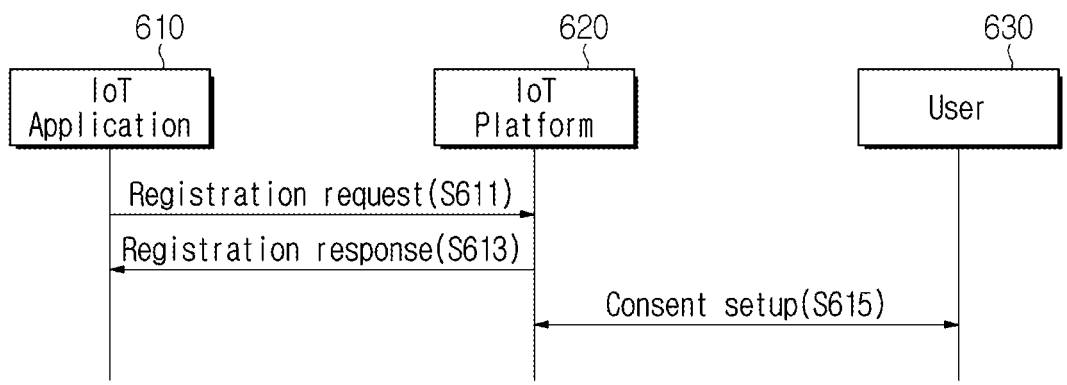
FIG. 6A is a view illustrating an example of a procedure for acquiring consent of a user according to a post-provisioning way in an M2M system according to the present disclosure.

FIG. 6A is a view illustrating an example of a procedure for acquiring consent of a user according to the post-provisioning way in an M2M system according to the present disclosure. Referring to FIG. 6A, at step S611, an IoT application 610 transmits a registration request message to an IoT platform 620. At step S613, the IoT platform 620 transmits a registration response message to the IoT application 610. Next, at step S615, a user 630 transmits a consent setup message to the IoT platform 620.

2. Pre-provisioning: When a user purchases an IoT device from a service provider, a consent may be given and embedded to the IoT device. When the device is registered to an IoT platform, the pre-provisioned consent may be included in a registration procedure. An example of a procedure for pre-provisioning is illustrated in FIG. 6B.

Figure 6B:
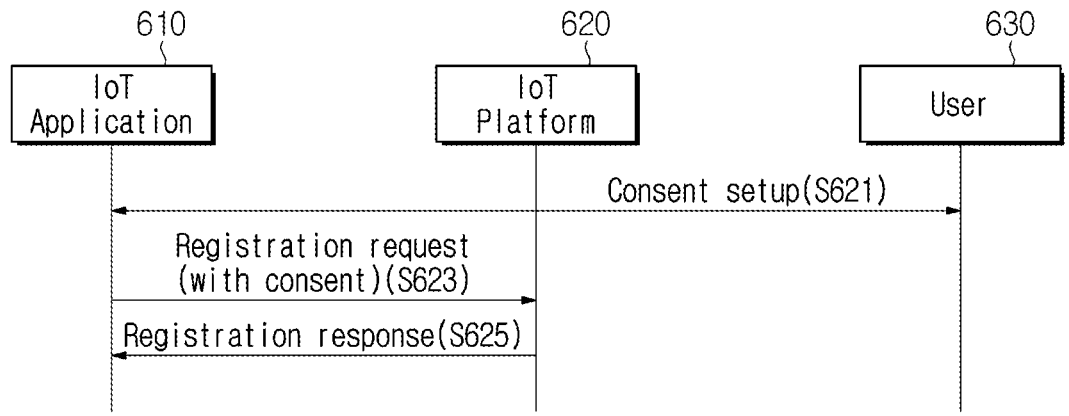
FIG. 6B is a view illustrating an example of a procedure for acquiring consent of a user according to a pre-provisioning way in an M2M system according to the present disclosure.

FIG. 6B is a view illustrating an example of a procedure for acquiring consent of a user according to the pre-provisioning way in an M2M system according to the present disclosure. Referring to FIG. 6B, at step S621, the user 630 transmits a consent setup message to the IoT application 610. Next, at step S623, the IoT application 610 transmits a registration request message to the IoT platform 620. Herein, the registration request message includes information on consent. At step S625, the IoT platform 620 transmits a registration response message to the IoT application 610.

3. Interactive-provisioning: When an IoT application is registered to an IoT platform, there is an additional procedure for acquiring a users' consent. An example of a procedure for pre-provisioning is illustrated in FIG. 6C.

Figure 6C:
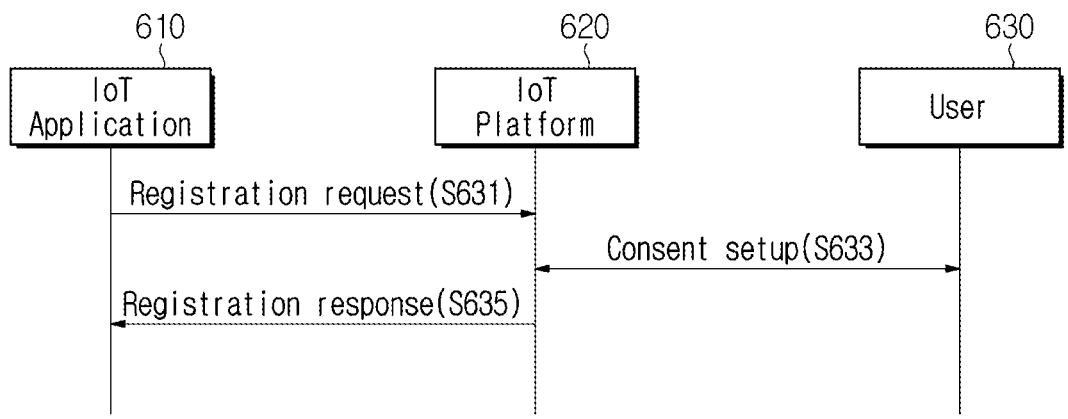
FIG. 6C is a view illustrating an example of a procedure for acquiring consent of a user according to an interactive-provisioning way in an M2M system according to the present disclosure.

FIG. 6C is a view illustrating an example of a procedure for acquiring consent of a user according to the interactive-provisioning way in an M2M system according to the present disclosure. Referring to FIG. 6C, at step S631, the IoT application 610 transmits a registration request message to the IoT platform 620. At step S633, the user 630 transmits a consent setup message to the IoT platform 620. Although not illustrated in FIG. 6C, prior to step S633, the IoT platform 620 or the IoT application 610 may request consent setup to the user 630. Herein, the registration request message includes information on consent. At step S635, the IoT platform 620 transmits a registration response message to the IoT application 610.

The three ways described above may be compared as follows. In case of the post-provisioning way, a user uses a UI (e.g., web UI) after registration in order to provide a consent. In case of the pre-provisioning way, a user or a service provider uses a pre-configured message at time of purchasing an IoT device. In case of the interactive-provisioning way, a user uses an enhanced registration procedure during registration. The three ways may be compared as shown in Table 5 below.

TABLE 5

| | Post-provisioning | Pre-provisioning | Interactive-provisioning |
| --- | --- | --- | --- |
| Who | User | User or Service provider | User |
| When | After registration | At purchasing IoT device | During registration |
| How | Using UI (e.g., web UI) | Using pre-configured message | Using enhanced registration procedures |

High-level requirements are needed to manage consent of a user in an IoT platform. Specifically, an IoT system supports management of consent for IoT data. Consent to IoT data should be freely given. IoT data identified as personal data should have unambiguous consent. An IoT system supports consent for a collection of IoT data.

In the case of a oneM2M system, management of consent of a user may be supported in various forms. According to various embodiments, consent of a user may be managed by attribute-based consent management, by resource-based consent management, or by access control policy (ACP)-based consent management. Hereinafter, the concept of each form will be described.

Attributed-Based Consent Management

An attribute for indicating consent may be added to IoT data identified as personal data. That is, when a resource is created which includes IoT data including personal data requiring consent, a consent-related attribute is added to the resource. An individual contentInstance, or container, or group may have the new consent-related attribute (e.g., 'consent'). When contentInstance includes the consent-related attribute, it may be interpreted that consent is given to an individual IoT data instance. When the container includes the attribute, it may be interpreted that consent is given to all the contentInstance resources under a subject container. When the group includes the attribute, it may be interpreted that consent is given to all the IoT data under the group.

Figure 7:
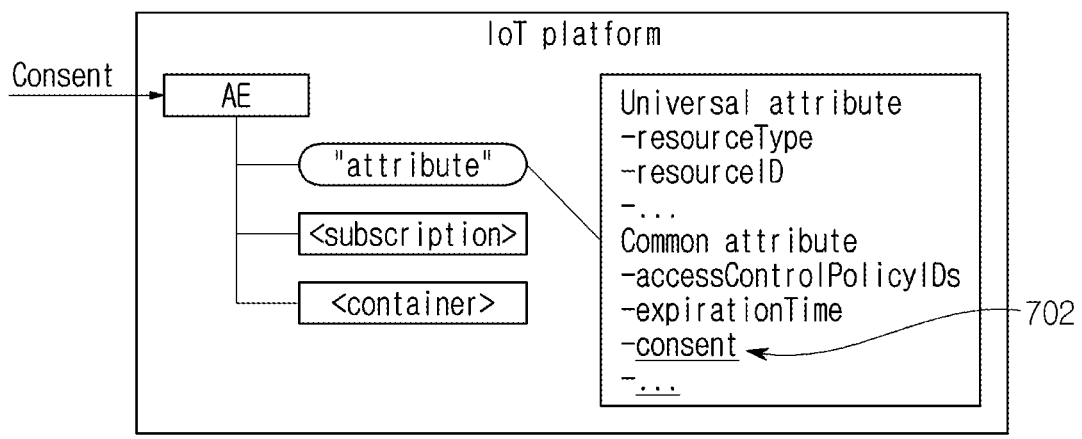
FIG. 7 is a view illustrating a concept of attribute-based consent management in an M2M system according to the present disclosure.

FIG. 7 is a view illustrating a concept of attribute-based consent management in an M2M system according to the present disclosure. Referring to FIG. 7, consent 702 is defined as one of the common attributes under "attribute". Herein, the attribute consent 702 may be defined as in Table 6 below.

TABLE 6

| Attribute name | Description |
| --- | --- |
| consent | Used to indicate whether the owner of the IoT data gives a permission to further process data for specific purposes |

Resource-Based Consent Management

Consent may include various pieces of information for clarifying purposes and related activities. According to an embodiment, in order to manage various pieces of information, a new resource managing consent (hereinafter referred to as 'consent resource') is defined. A consent resource may contain a list of resources under a same resource. For example, activities and information may be modeled as a dedicated resource (e.g., consentMgt), and each resource identified as personal data refers to at least one relevant consent resource. A consent resource may be used to store a purpose and relevant information. The consent resource may contain identification information of consent and have a plurality of consents defining different processing rules. In addition, the consent resource may contain a list of resources related to a same consent.

Figure 8:
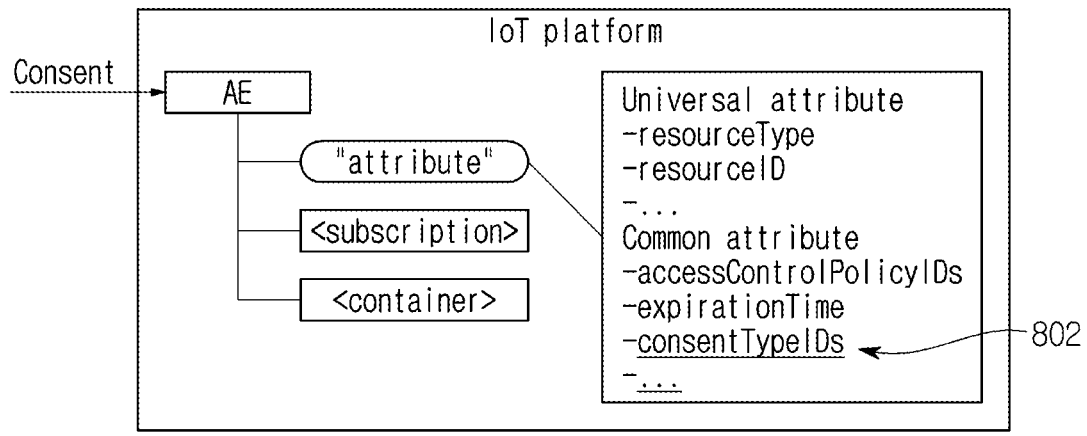
FIG. 8 is a view illustrating a concept of resource-based consent management in an M2M system according to the present disclosure.

FIG. 8 is a view illustrating a concept of resource-based consent management in an M2M system according to the present disclosure. Referring to FIG. 8, consentTypeIDs 802 is defined as one of the common attributes under "attribute". For example, a resource for managing consent may contain at least one of the attributes listed in Table 7 below.

TABLE 7

| Attribute name | Description |
| --- | --- |
| Owner | Owner of the consent |
| createdTime | When this consent is created |
| Name | Name of consent |
| allowedProcessing | What kinds of processing is allowed (e.g., processing, sharing with $3^{rd}$ party) |
| Validity | Validity of the consent |
| Identifier | Identifier of the consent |
| expirationTime | Expiration of the consent |
| rightToWithdraw | Indicate whether the owner has a right to withdraw the consent at anytime |

Additionally, apart from the attributes listed in Table 7, a consent resource may further contain at least one of a list of groups to which the owner of the consent belongs (e.g., business, consumer, manager, VIP), identification information of the consent, and a list of consent groups to which the consent belongs (e.g., specific application, marketing campaign, cookie type).

ACP-Based Consent Management

As consent handles a data owner's intention for using data, consent may be considered as a part of ACP. When the contents of data are related to personally identifiable information, only a content with consent of a user may be shared or used by a person different from the data owner. Accordingly, consent may be handled as one of ACPs. Therefore, the present invention proposes a method of enhancing an ACP mechanism so as to process consent management.

oneM2M uses a RESTful architecture that follows the representational state transfer (REST) principle. API requests to perform an operation on a resource. Herein, operations include Create, Retrieve, Update, and Delete. A CSE cannot make a resource access judgement call. Accordingly, a CSE needs a clear rule dictated for each resource, and this rule is an ACP. An ACP defines a rule regarding who (e.g., CSE, AE) is authorized to access, what operations, what circumstances (e.g., time, location of entity) and the like.

Figure 9A:
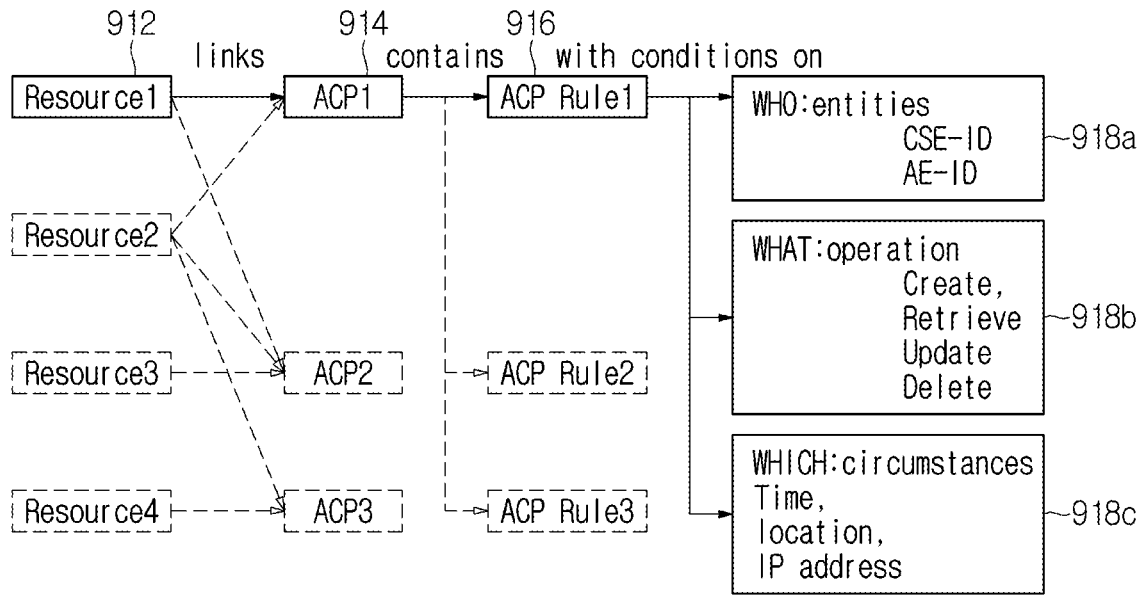
FIG. 9A is a view illustrating a structure of an access control policy (ACP) rule for ACP-based consent management in an M2M system according to the present disclosure.

FIG. 9A is a view illustrating a structure of an access control policy (ACP) rule for ACP-based consent management in an M2M system according to the present disclosure. Referring to FIG. 9A, one resource 912 is linked to one ACP 914, and the ACP 914 contains an ACP rule 916. The ACP rule 916 is related to conditions on an item about entities 918a, operations 918b and circumstances 918c. When conditions (e.g., WHO, WHAT, WHICH) are satisfied by a requesting entity, a requested operation and a circumstance, the ACP rule 916 is satisfied.

Consent of a user may be managed by an ACP mechanism covering consent management. For this, an additional attribute and a mechanism may be added to an ACP. In consent management, it is important to define what type of processing is permitted by a service provider. An attribute (hereinafter referred to as 'consent rule attribute') defining consent management rules may be defined accordingly. A consent rule attribute may be applied to a resource referring to an ACP resource.

Figure 9B:
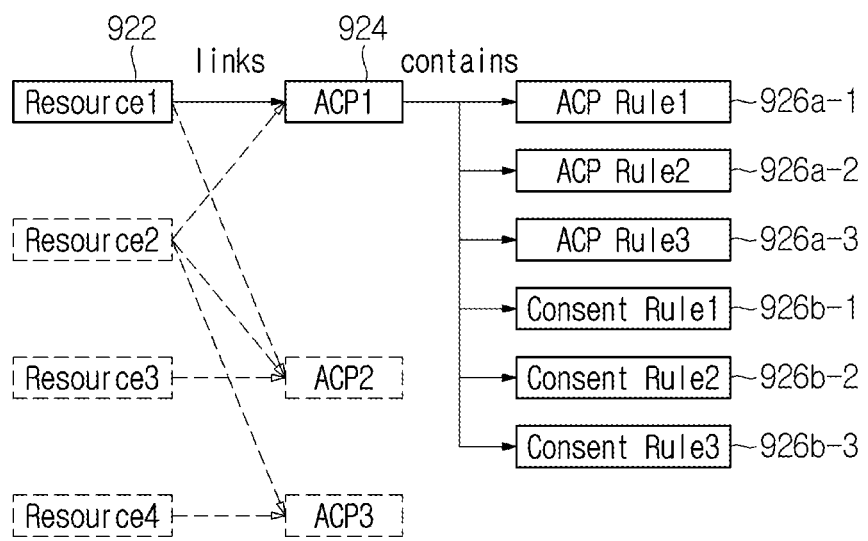
FIG. 9B is a view illustrating an ACP rule for ACP-based consent management and a structure of a consent rule in an M2M system according to the present disclosure.

FIG. 9B is a view illustrating an ACP rule for ACP-based consent management and a structure of a consent rule in an M2M system according to the present disclosure. Referring to FIG. 9B, a resource 922 is linked to an ACP 924. The ACP 924 contains a plurality of ACP rules 926a-1 to 926a-3 and a plurality of consent rules 926b-1 to 926b-3. When conditions (e.g., WHO, WHAT, WHICH) are satisfied by a requesting entity, a requested operation and a circumstance, a consent rule is satisfied.

An ACP resource may be referred to as <accessControlPolicy> and contain at least one of the attributes listed in Table 8 below.

TABLE 8

| Attribute | multiplicity | RW/RO/WO | Description | <accessControlPolicyAnnc> attribute |
| --- | --- | --- | --- | --- |
| resourceType | 1 | RO | See clause 9.6.1.3. | NA |
| resourceID | 1 | RO | See clause 9.6.1.3. | NA |
| resourceName | 1 | WO | See clause 9.6.1.3. | NA |
| parentID | 1 | RO | See clause 9.6.1.3. | NA |
| expirationTime | 1 | RW | See clause 9.6.1.3. | MA |
| labels | 0 . . . 1(L) | RW | See clause 9.6.1.3. | MA |
| creationTime | 1 | RO | See clause 9.6.1.3. | NA |
| lastModifiedTime | 1 | RO | See clause 9.6.1.3. | NA |

TABLE 8-continued

| Attribute | multiplicity | RW/RO/WO | Description | <accessControlPolicyAnnc> attribute |
|---|---|---|---|---|
| announceTo | 0 ... 1(L) | RW | See clause 9.6.1.3. | NA |
| announcedAttribute | 0 ... 1(L) | RW | See clause 9.6.1.3. | NA |
| announceSyncType | 0 ... 1 | RW | See clause 9.6.1.3. | MA |
| owner | 0 ... 1 | RW | See clause 9.6.1.3. | NA |
| privileges | 1 | RW | A set of access control rules that applies to resources referencing this <accessControlPolicy> resource using the accessControlPolicyID attribute. | MA |
| selfPrivileges | 1 | RW | A set of access control rules that apply to the <accessControlPolicy> resource itself and accessControlPolicyIDs attribute of any other resource which is linked to this <accessControlPolicy> resource. | MA |
| consents | 1 | RW | A set of consent management rules that applies to resources referencing this <accessControlPolicy> resource | NA |
| authorizationDecisionResourceIDs | 0 ... 1(L) | RW | A list of addresses of <authorizationDecision> resources. See clause 9.6.41 for further details. | MA |
| authorizationPolicyResourceIDs | 0 ... 1(L) | RW | A list of addresses of <authorizationPolicy> resources. See clause 9.6.42 for further details. | MA |
| authorizationInformationResourceIDs | 0 ... 1(L) | RW | A list of addresses of <authorizationInformation> resources. See clause 9.6.43 for further details. | MA |

In Table 8, an attribute <consents> may be understood as the above-described consent rule attribute. The set of consent management rules expressed in the attribute <consents> contains consent-management-rule-tuples (e.g., consentOwner, createdTime, consentName, allowedProcessing, consentValidity, expirationTime, rightToWithdraw). For example, the tuples may contain at least one of the items listed in Table 9.

TABLE 9

| Name | Description |
|---|---|
| consentOwner | Owner of the consent |
| consentTimestamp | When this consent is created |
| consentName | Name of consent |
| consentAllowedProcessing | What kinds of processing is allowed (e.g., processing, sharing with 3$^{rd}$ party) |
| consentCollectionMethod | Describe the method by which consent was obtained |
| consentValidity | Validity of the consent |
| consentIdentifier | Identifier of the consent |
| consentExpirationTime | Expiration of the consent |
| consentRightToWithdraw | Indicate whether the owner has a right to withdraw the consent at anytime |
| consentPublicKey | Controller's public key |
| ThirdPartyDisclosure | Indicates if the controller is disclosing personal information to a third party |
| ThirdPartyName | The name of the third party to which the processor may disclose the personal information |

Figure 9C:
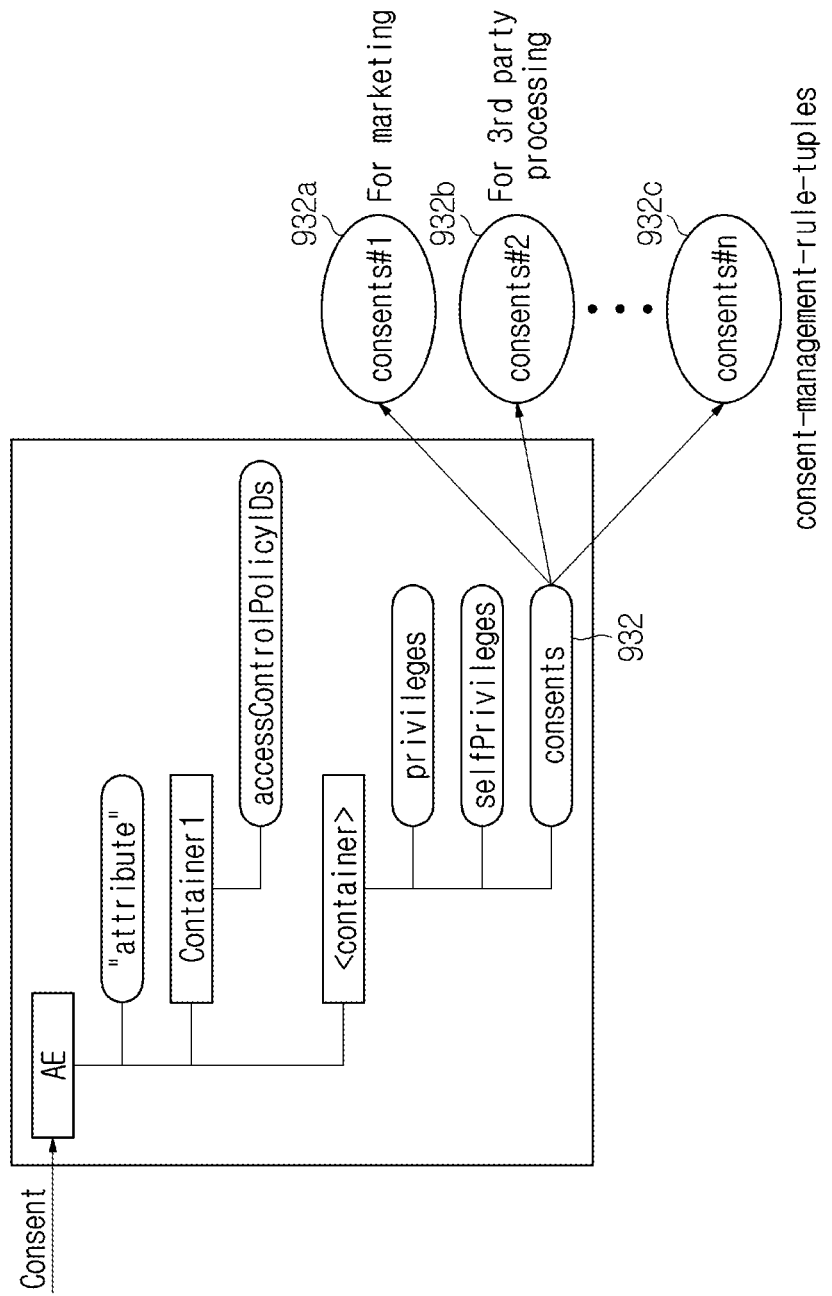
FIG. 9C is a view illustrating a concept of ACP-based consent management in an M2M system according to the present disclosure.

FIG. 9C is a view illustrating a concept of ACP-based consent management in an M2M system according to the present disclosure. Referring to FIG. 9C, the attribute <consents>932 may be included in the resource <ACP1> and may be related to a plurality of consents 932a to 932c. The plurality of consents 932a to 932c may be comprised of different consent management rule tuples. According to contents of consent management rule tuples, consent with various conditions may be defined. For example, according to the contents of the consent management rule tuples, consent for marketing and consent for third party processing may be defined.

Figure 10:
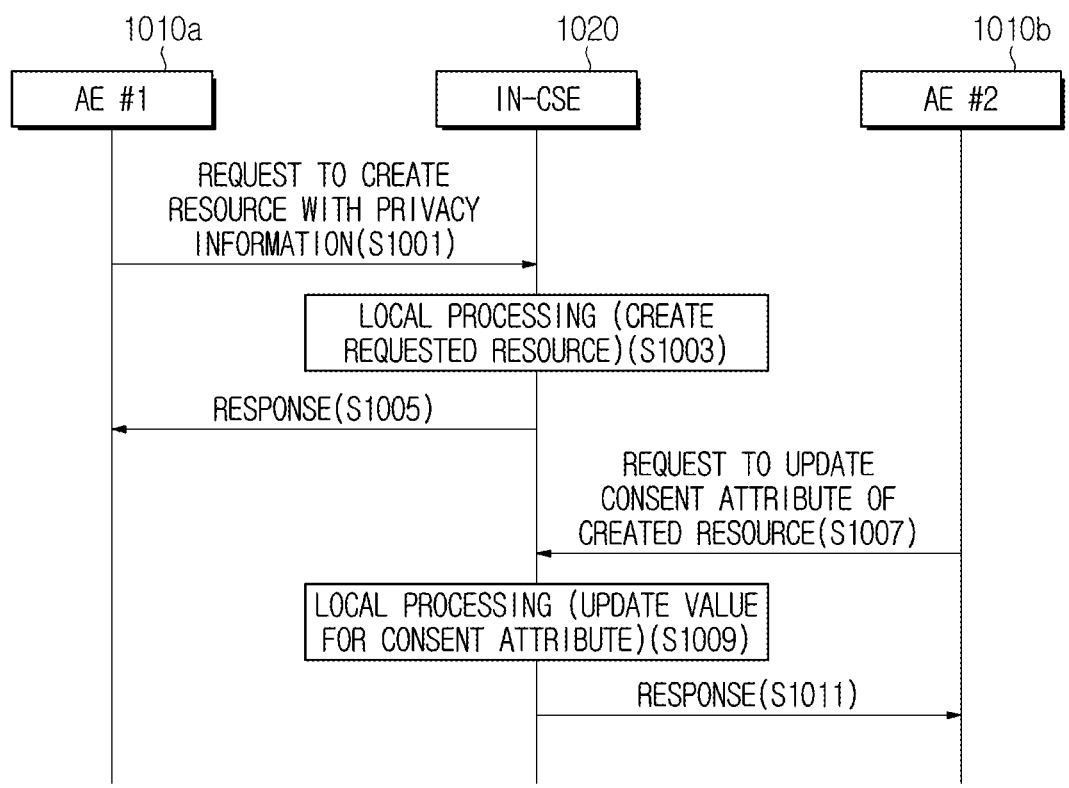
FIG. 10 is a view illustrating a more detailed example of a procedure for acquiring consent of a user according to the post-provisioning way in an M2M system according to the present disclosure.

FIG. 10 is a view illustrating a more detailed example of a procedure for acquiring consent of a user according to the post-provisioning way in an M2M system according to the present disclosure. FIG. 10 illustrates the procedure of FIG. 6A in further detail, showing signal exchange among AE #1 1010a, AE #2 1010b, and infrastructure node-common service entity (IN-CSE) 1020. In FIG. 10, the AE #1 1010a is an originator requesting to create a resource, the IN-CSE 1020 is a CSE hosting a resource, and the AE #2 1010b is a device used by a user. For example, the AE #1 1010a may be a device that provides a service based on IoT communication, and the AE #2 1010b may be a device (e.g., smart phone), which a user uses to control the AE #1 1010a or to interact with the AE #1 1010a.

Referring to FIG. 10, at step S1001, the AE #1 1010a transmits, to the IN-CSE 1020, a request message for creating a resource with privacy information. Although not illustrated in FIG. 10, prior to this procedure, the AE #1 1010a and the IN-CSE 1020 may perform a registration procedure. After registration, while the AE #1 1010a provides a service to the AE #2 1010b, the AE #1 1010a may obtain, from the AE #2 1010b, data corresponding to a user's privacy information or data from which the privacy information can be inferred. In this case, like in this step, the AE #1 1010a initiates a procedure of creating a resource for managing consent to process the privacy information.

At step S1003, the IN-CSE 1020 performs local processing. Specifically, the IN-CSE 1020 creates a resource requested from the AE #1 1010a. That is, the IN-CSE 1020 creates the resource with privacy information. According to an embodiment, the resource with privacy information may include a consent-related attribute. According to another embodiment, the IN-CSE 1020 may further create a consent-related resource. According to yet another embodiment, the IN-CSE 1020 may create a consent-ACP. Herein, since it has not been confirmed whether or not the user gave consent, at least one of consent-related attributes or tuples is initialized to a value meaning that there is no consent or that it cannot be known whether or not there is consent.

At step S1005, the IN-CSE 1020 transmits a response message to the AE #1 1010*a*. In other words, the IN-CSE 1020 notifies that the resource requested by the AE #1 1010*a* is created.

At step S1007, the AE #2 1010*b* transmits, to the IN-CSE 1020, an update message for updating a consent attribute of the created resource. The update message includes information related to consent to use the privacy information. The information related to consent may include at least one of information regarding whether or not to give consent, information on an owner of consent, information on a scope of consent, information on expiration time of consent, and information on variability of consent. For example, the AE #2 1010*b* may check information regarding whether or not to give consent, as input from the user, and may create information regarding whether or not consent is given, based on the checked information. Herein, the user's intention concerning whether or not to give consent may be input via a web interface. Although not illustrated in FIG. 10, according to another embodiment, prior to step S1007, the IN-CSE 1020 may transmit, to AE #2 1010*b* or AE #1 1010*a*, a message for requesting information regarding whether or not to give consent.

At step S1009, the IN-CSE 1020 performs local processing. Specifically, the IN-CSE 1020 updates a value for a consent attribute according to the request of AE #2 1010*a*. For example, the IN-CSE 1020 configures a value of at least one of consent-related attributes or tuples based on consent-related information included in an update message received from AE #2 1010*a*.

At step S1011, the IN-CSE 1020 transmits a response message to the AE #2 1010*b*. In other words, the IN-CSE 1020 notifies that the value of at least one of consent-related attributes or tuples is updated according to the request of AE #2 1010*b*.

Figure 11:
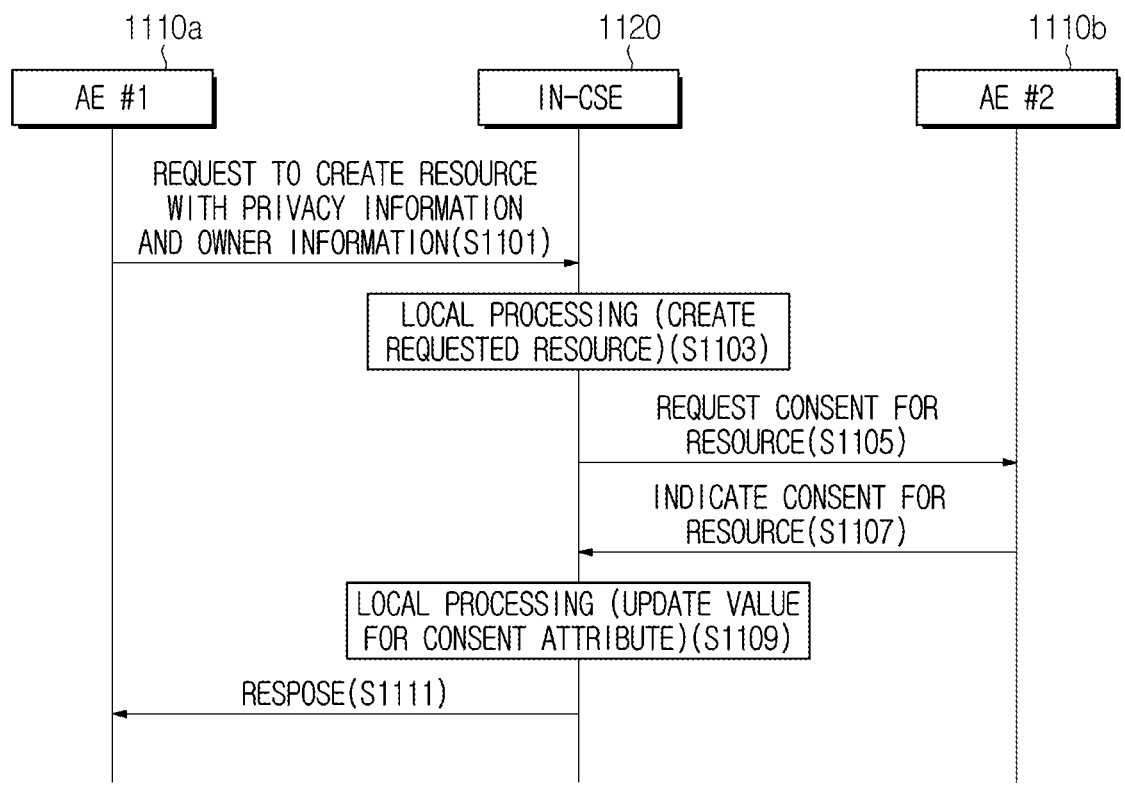
FIG. 11 is a view illustrating a more detailed example of a procedure for acquiring consent of a user according to the interactive-provisioning way in an M2M system according to the present disclosure.

FIG. 11 is a view illustrating a more detailed example of a procedure for acquiring consent of a user according to the interactive-provisioning way in an M2M system according to the present disclosure. Showing the procedure of FIG. 6C in further detail, FIG. 11 illustrates signal exchange among AE #1 1110*a*, AE #2 1110*b*, and IN-CSE 1120. In FIG. 11, the AE #1 1110*a* is an originator requesting to create a resource, the IN-CSE 1120 is a CSE hosting a resource, and the AE #2 1110*b* is a device used by a user. For example, the AE #1 1110*a* may be a device that provides a service based on IoT communication, and the AE #2 1110*b* may be a device (e.g., smart phone), which a user uses to control the AE #1 1110*a* or to interact with the AE #1 1110*a*.

Referring to FIG. 11, at step S1101, the AE #1 1110*a* transmits, to the IN-CSE 1120, a request message for creating a resource including privacy information and owner information. Herein, the owner information indicates that the owner of the privacy information is the AE #1 1110*b*. Although not illustrated in FIG. 11, prior to this procedure, the AE #1 1110*a* and the IN-CSE 1120 may perform a registration procedure. After registration, while the AE #1 1110*a* provides a service to the AE #2 1110*b*, the AE #1 1110*a* may obtain, from the AE #2 1110*b*, data corresponding to a user's privacy information or data from which the privacy information can be inferred. In this case, like in this step, the AE #1 1110*a* initiates a procedure of creating a resource for managing consent to process the privacy information.

At step S1103, the IN-CSE 1120 performs local processing. Specifically, the IN-CSE 1120 creates a resource requested from the AE #1 1110*a*. That is, the IN-CSE 1120 creates the resource with privacy information. According to an embodiment, the resource with privacy information may include a consent-related attribute. According to another embodiment, the IN-CSE 1120 may further create a consent-related resource. According to yet another embodiment, the IN-CSE 1120 may create a consent-related ACP. Herein, since it has not been confirmed whether or not the user gives consent, at least one of the consent-related attributes or tuples is initialized to a value meaning that there is no consent or that it cannot be known whether or not there is consent.

At step S1105, the IN-CSE 1120 transmits, to the AE #2 1110*b*, a request message for requesting consent for a created resource. That is, after creating a resource with privacy information, the IN-CSE 1120 requests consent necessary for using the privacy information. The IN-CSE 1120 may identify the AE #2 1110*b* based on owner information provided from the AE #1 1110*a*.

At step S1107, the AE #2 1110*b* transmits, to the IN-CSE 1120, a response message for indicating consent for the resource. The response message includes information related to consent to use the privacy information. The information related to consent may include at least one of information regarding whether or not to give consent, information on an owner of consent, information on a scope of consent, information on expiration time of consent, and information on variability of consent. For example, the AE #2 1110*b* may check information regarding whether or not to give consent, as input from the user, and may create information regarding whether or not consent is given, based on the checked information. Herein, the user's intention concerning whether or not to give consent may be input via a web interface.

At step S1109, the IN-CSE 1120 performs local processing. Specifically, the IN-CSE 1120 updates a value for a consent attribute according to the response of AE #2 1110*a*. For example, the IN-CSE 1120 configures a value for at least one of consent-related attributes or tuples based on consent-related information included in an update message received from AE #2 1110*a*.

At step S1111, the IN-CSE 1120 transmits a response message to the AE #1 1110*a*. In other words, the IN-CSE 1120 notifies that the resource requested by the AE #1 1110*a* is created.

Figure 12:
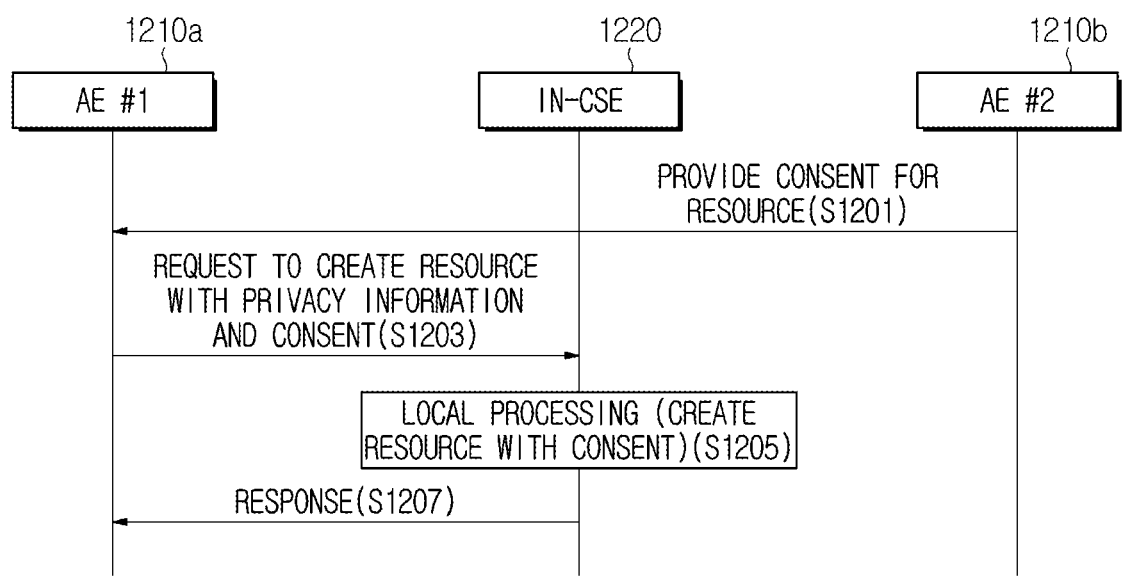
FIG. 12 is a view illustrating a more detailed example of a procedure for acquiring consent of a user according to the pre-provisioning way in an M2M system according to the present disclosure.

FIG. 12 is a view illustrating a more detailed example of a procedure for acquiring consent of a user according to the pre-provisioning way in an M2M system according to the present disclosure. Showing the procedure of FIG. 6B in further detail, FIG. 12 illustrates signal exchange among AE #1 1210*a*, AE #2 1210*b*, and IN-CSE 1220. In FIG. 12, the AE #1 1210*a* is an originator requesting to create a resource, the IN-CSE 1220 is a CSE hosting a resource, and the AE #2 1210*b* is a device used by a user. For example, the AE #1 1210*a* may be a device that provides a service based on IoT communication, and the AE #2 1210*b* may be a device (e.g., smart phone), which a user uses to control the AE #1 1210*a* or to interact with the AE #1 1210*a*.

Referring to FIG. 12, at step S1201, the AE #2 1212*b* transmits, to the AE #1 1212*a*, a message for providing consent for a resource. The message includes information related to consent to use privacy information. The information related to consent may include at least one of information regarding whether or not to give consent, information on an owner of consent, information on a scope of consent, information on expiration time of consent, and information on variability of consent. For example, the AE #2 1210b may check information regarding whether or not to give consent, as input from the user, and may create information regarding whether or not consent is given, based on the checked information. Herein, the user's intention concerning whether or not to give consent may be input via a web interface. For example, this step may be implemented while a user of the AE #2 1212b installs and configures the AE #1 1212a.

At step S1203, the AE #1 1212a transmits, to the IN-CSE 1220, a request message for creating a resource with privacy information and consent. Herein, owner information indicates that the owner of the privacy information is the AE #1 1210b. While the AE #1 1210a provides a service to the AE #2 1210b, the AE #1 1210a may obtain, from the AE #2 1210b, data corresponding to a user's privacy information or data from which the privacy information can be inferred. In this case, like in this step, the AE #1 1210a initiates a procedure of creating a resource for managing consent to process the privacy information.

At step S1205, the IN-CSE 1220 performs local processing. Specifically, the IN-CSE 1220 creates a resource requested from the AE #1 1212a. Specifically, the IN-CSE 1220 creates a resource requested from the AE #1 1210a. That is, the IN-CSE 1220 creates the resource with privacy information. According to an embodiment, the resource with privacy information may include a consent-related attribute. According to another embodiment, the IN-CSE 1220 may further create a consent-related resource. According to yet another embodiment, the IN-CSE 1220 may create a consent-related ACP. Herein, since it has not been confirmed whether or not the user give consent, at least one of consent-related attributes or tuples is initialized to a value meaning that there is no consent or that it cannot be known whether or not there is consent.

At step S1207, the IN-CSE 1220 transmits a response message to the AE #1 1212a. In other words, the IN-CSE 1220 notifies that a resource requested by the AE #1 1210a is created.

Figure 13:
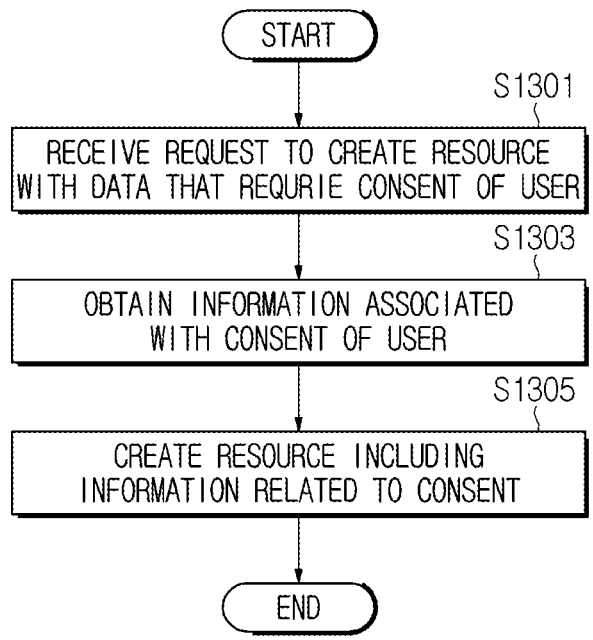
FIG. 13 is a view illustrating an example of a procedure for managing information associated with consent of a user in an M2M system according to the present disclosure.

FIG. 13 is a view illustrating an example of a procedure for managing information related to consent of a user in an M2M system according to the present disclosure. FIG. 13 illustrates an operation method of a device (e.g., IN-CSE) that manages consent-related information. In the description referring to FIG. 13, the operation subject is referred to as "device".

Referring to FIG. 13, at step S1301, a device receives a request for creating a resource that includes personal data that requires consent of a user. Herein, together with the request, at least one of the personal data and information on consent of the user may be received.

At step S1303, the device obtains the information on the consent of the user. The information on the consent may be received from a first device, which collects personal data during service, or from a second device used by the user. In addition, the information on the consent may be received after the request for resource creation is received or together with the request. The information related to consent may include at least one of information regarding whether or not to give consent, information on an owner of consent, information on a scope of consent, information on expiration time of consent, and information on variability of consent.

At step S1305, the device creates a resource including the information on the consent. Herein, the resource may be identical with a resource including personal data or a separate resource different from the resource including personal data. When the resource including the information on the consent is separate from the resource including the personal data, the resource including the personal data refers to a resource including the information on the consent.

Figure 14:
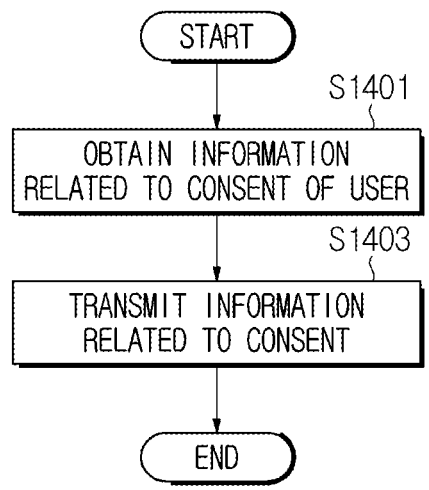
FIG. 14 is a view illustrating an example of a procedure for providing information associated with consent of a user in an M2M system according to the present disclosure.

FIG. 14 is a view illustrating an example of a procedure for providing information related to consent of a user in an M2M system according to the present disclosure. FIG. 14 illustrates an operation method of a device providing consent-related information (e.g., AE #1 or AE #2). In the description referring to FIG. 14, the operation subject is referred to as "device".

Referring to FIG. 14, at step S1401, a device obtains information related to consent of a user. The information related to consent may include at least one of information regarding whether or not to give consent, information on an owner of consent, information on a scope of consent, information on expiration time of consent, and information on variability of consent. For example, when the device is a user device (e.g., AE #2), the device may obtain the information related to the consent through an input means in the device. In this case, the device may display a screen for requesting a response necessary to determine whether or not to give consent and relevant items to the user and may monitor the user's input as response on the screen. As another example, when the device is a device providing an IoT service (e.g., AE #1), the device may receive the information related to the consent via a communication link from another device.

At step S1403, the device transmits the information related to the consent. The device transmits the information related to the consent to a device (e.g., IN-CSE) that manages consent-related information. The transmitted information related to the consent is used to create a resource attribute related to consent.

Figure 15:
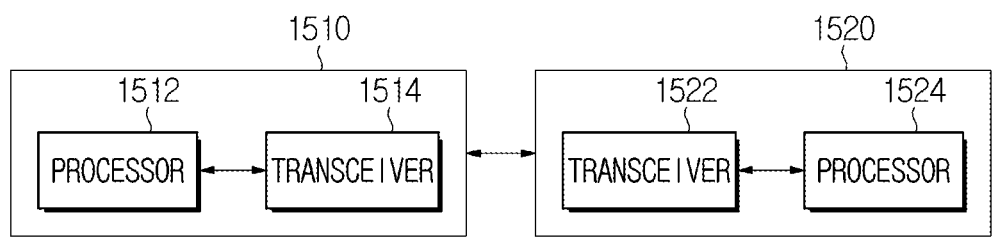
FIG. 15 illustrates a configuration of an M2M device in an M2M system according to the present disclosure.

FIG. 15 illustrates a configuration of an M2M device in an M2M system according to the present disclosure. An M2M device 1510 or an M2M device 1520 illustrated in FIG. 15 may be understood as hardware functioning as at least one among the above-described AE, CSE and NSE.

Referring to FIG. 15, the M2M device 1510 may include a processor 1512 controlling a device and a transceiver 1514 transmitting and receiving a signal. Herein, the processor 1512 may control the transceiver 1514. In addition, the M2M device 1510 may communicate with another M2M device 1520. The another M2M device 1520 may also include a processor 1522 and a transceiver 1524, and the processor 1522 and the transceiver 1524 may perform the same function as the processor 1512 and the transceiver 1514.

As an example, the originator, the receiver, AE and CSE, which are described above, may be one of the M2M devices 1510 and 1520 of FIG. 15, respectively. In addition, the devices 1510 and 1520 of FIG. 15 may be other devices. As an example, the devices 1510 and 1520 of FIG. 15 may be communication devices, vehicles, or base stations. That is, the devices 1510 and 1520 of FIG. 15 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a machine-to-machine (M2M) device in an M2M system, the method comprising:
    receiving, by the M2M device, from a first Internet of things (IoT) device, a resource creation request message including personal data and owner information for the personal data;
    in response to receiving the request message, creating, by the M2M device, a resource including the personal data and a consent-related attribute for use of the personal data, wherein the consent-related attribute is set to an initial value indicating that user consent has not been confirmed;
    transmitting, by the M2M device, to a second IoT device identified based on the owner information, a request message for requesting consent for a created resource;
    receiving, by the M2M device, from the second IoT device, information related to consent of a user for use of the personal data; and
    updating, by the M2M device, the consent-related attribute based on the information related to consent of the user;
    wherein the updated consent-related attribute comprises an allowedProcessing attribute indicating what kind of processing is allowed for the personal data and a rightToWithdraw attribute indicating whether the owner has a right to withdraw the consent for personal data at any time; and
    wherein the consent-related attribute further includes at least one of an owner attribute indicating an owner of the consent, a createdTime attribute indicating when the consent is created, a name attribute indicating a name of the consent, a validity attribute indicating validity of the consent, an identifier indicating an identifier of the consent, and an expirationTime attribute indicating an expiration time of the consent.

2. The method of claim 1, wherein the information related to consent of the user is received to the M2M device through a registration procedure for the IoT device.

3. The method of claim 1, wherein the information related to consent of the user is received from a device of the user to the M2M device after the registration procedure for the IoT device.

4. The method of claim 1, wherein the information related to consent of the user is received by the M2M device during the registration procedure for the IoT device.

5. The method of claim 1, wherein the created resource includes a resource dedicated to consent management, and
    wherein the resource dedicated to consent management is referred to by a resource that includes the personal data.

6. The method of claim 1, wherein the consent-related resource includes an access control policy (ACP) resource that includes at least one attribute for defining an ACP related to the consent, and
    wherein the ACP resource is referred to by a resource including the personal data.

7. The method of claim 1, wherein the consent-related resource includes an access control policy (ACP) resource that includes at least one attribute for defining an ACP related to the consent, and
    wherein the ACP resource includes at least one attribute among an ACP applying to a resource that refers to the ACP resource, an ACP applying to the ACP resource itself, and a consent management rule applying to the resource that refers to the ACP resource.

8. A machine-to-machine (M2M) device in an M2M system, the M2M device comprising:
    a transceiver configured to transmit and receive a signal; and
    a processor configured to control the transceiver,
    wherein the processor is further configured to:
        receive, from a first Internet of things (IoT) device, a resource creation request message including personal data and the owner information for the personal data,
        in response to receiving the request message, create a resource including the personal data and a consent-related attribute for use of the personal data, wherein the consent-related attribute is set to an initial value indicating that user consent has not been confirmed,
        transmit, to a second IoT device identified based on the owner information, a request message for requesting consent for a created resource,
        receive, from the second IoT device, information related to consent of a user for use of the personal data, and
        update the consent-related attribute based on the information related to a consent of a user,
    wherein the updated consent-related attribute comprises an allowedProcessing attribute indicating what kind of processing is allowed for the personal data and a rightToWithdraw attribute indicating whether the owner has a right to withdraw the consent for personal data at any time, and
    wherein the consent-related attribute further includes at least one of an owner attribute indicating an owner of the consent, a createdTime attribute indicating when the consent is created, a name attribute indicating a name of the consent, a validity attribute indicating validity of the consent, an identifier indicating an identifier of the consent, and an expirationTime attribute indicating an expiration time of the consent.

9. The M2M device of claim 8, wherein the information related to consent of the user is received to the M2M device through a registration procedure for the IoT device.

10. The M2M device of claim 8, wherein the information related to consent of the user is received from a device of the user to the M2M device after the registration procedure for the IoT device.

11. The M2M device of claim 8, wherein the information related to consent of the user is received by the M2M device during the registration procedure for the IoT device.

12. The M2M device of claim 8, wherein the consent-related resource includes an access control policy (ACP) resource that includes at least one attribute for defining an ACP related to the consent, and
    wherein the ACP resource is referred to by a resource including the personal data.

13. The M2M device of claim 8, wherein the consent-related resource includes an access control policy (ACP) resource that includes at least one attribute for defining an ACP related to the consent, and
    wherein the ACP resource includes at least one attribute among an ACP applying to a resource that refers to the ACP resource, an ACP applying to the ACP resource itself, and a consent management rule applying to the resource that refers to the ACP resource.

\* \* \* \* \*